B. MAGOR.
SIDE FRAME FOR TRUCKS.
APPLICATION FILED APR. 9, 1912.

1,182,026.

Patented May 9, 1916.

Witnesses:
Geo. H. Maxx
H. Wachter

Inventor
Basil Magor
By his Attorneys
Emery Booth Janney and Varney

UNITED STATES PATENT OFFICE.

BASIL MAGOR, OF NEW YORK, N. Y., ASSIGNOR TO MAGOR CAR COMPANY, OF NEW YORK, N. Y., A CORPORATION OF NEW JERSEY.

SIDE FRAME FOR TRUCKS.

1,182,026.  Specification of Letters Patent.  Patented May 9, 1916.

Application filed April 9, 1912. Serial No. 689,450.

*To all whom it may concern:*

Be it known that I, BASIL MAGOR, a subject of the King of Great Britain, and a resident of the borough of Manhattan, in the city of New York, county and State of New York, have invented an Improvement in Side Frames for Trucks, of which the following description, in connection with the accompanying drawings, is a specification, like letters on the drawings representing like parts.

The object of the invention is to provide an improved construction for the side frames of car trucks with a view toward simplicity in the manufacture and assembling of said frames and also toward getting the maximum strength out of a given amount of metal.

Figure 1:
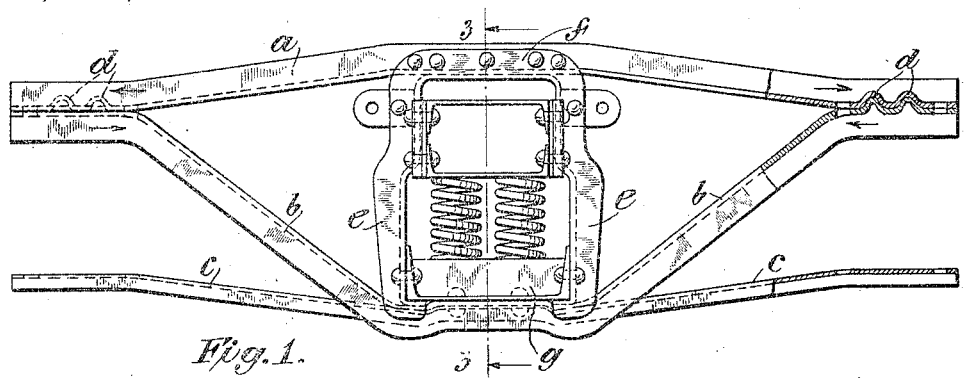
Figure 2:
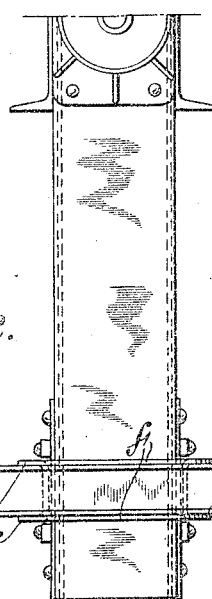
Figure 3:
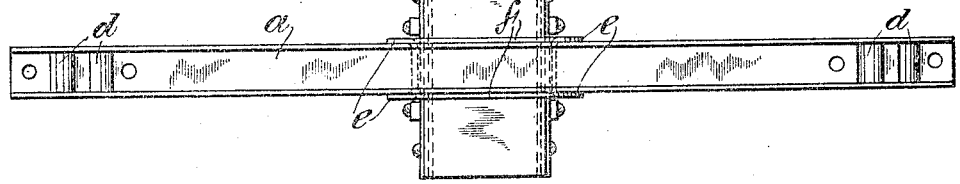

The drawings wherein the improvements are illustrated contain,

Figure 1, a view in elevation of a frame embodying the invention. Fig. 2, a top plan view, and, Fig. 3, a view in section, the plane of which is indicated by the line 3—3 in Fig. 1.

The top arch bar $a$, the bottom arch $b$ and the tie bar $c$ are all related in the usual manner and are preferably formed of channel iron, the upper bar with its channel facing upwardly, that of the bottom bar facing downwardly and the tie bar lying along or being embraced by the channel of the bottom bar. To resist the shear acting along the ends where the bottom bar and top bar are fastened together, ridges $d$ are pressed in the bottoms of the channels $a$ and $b$ so that when these bars are placed together, the ridges in the channel $b$ will fit into those in channel $a$. Such a construction is very simple and takes most of the shearing strain (indicated by the arrows) which would otherwise come upon the fastening bolts or rivets.

The truck columns $e$ are formed as side members of a yoke $f$ which is preferably a wrought steel member and channeled. The channel faces outwardly so that it may be made to embrace the top and bottom arch bars between which it is located. Thus, as shown, the bar $a$ lies within the channel of the yoke at the top and is riveted thereto; and the ends of the side-members $e$ are bent inwardly so that the channels of these short sections overlie the bottom arch bar $b$. Upon these short sections, the end of the spring plank $g$ rests, the bottom arch bar $b$ and the tie bar $c$ being pressed upwardly between the short bent-in sections of the yoke, so as to meet the spring plank $g$ to which they are riveted, the spring plank also being riveted to the side members or truck columns $e$. Such a construction provides a very strong support for the spring plank as the metal is not weakened by bolt holes and the like where the shear comes, as in the case of many of the present constructions.

It will be obvious that the present construction offers increased strength with reduction of metal.

I claim as my invention:

1. A side frame for a car truck having a top bar, a bottom bar, and a channeled yoke the side members of which are bent inwardly at the bottom and constitute the truck columns, the top bar lying within the channel connecting the said side members and the bottom bar extending through the channels on each of the bent-in portions of the said side members.

2. A side frame for a car truck having a top bar, a bottom bar, a tie bar, and a channeled yoke the side members of which are bent inwardly at the bottoms and constitute the truck columns, the top bar lying within the channel connecting the said side members, the bottom bar extending through the channels in each of the bent-in portions of said side members, and the tie bar lying within the channel of the bottom bar.

3. In a car truck, the combination with a spring plank, of a side frame having a top bar, a bottom bar, and a yoke having side members bent inwardly at the bottoms and constituting the truck columns, the end of the spring plank resting upon the bent-in portions of the yoke.

4. In a car truck, the combination with the spring plank, of a side frame having a top bar, a bottom bar, a channeled yoke between the top and bottom bars with the channel facing outside and the bars being embraced thereby, the ends of the side members of the yoke being bent inwardly, and the end of the spring plank resting thereon.

5. In a car truck, the combination with the spring plank, of a side frame having a top channeled bar with the channel facing upwardly, a bottom channeled bar with the channel facing downwardly, a channeled yoke between said bars with the channel facing outside and the bars being embraced thereby, the ends of the side members of the yoke being bent inwardly upon the bottom bar and the end of the spring plank resting on said bent-in ends, and a tie bar embraced by the channel of the bottom bar.

6. A side frame for car trucks having a top channel bar, a bottom channel bar and interposed spacing means comprising a U-shaped member having a transverse portion adapted to support the upper channel bar.

7. A side frame for car trucks comprising upper and lower channel bars and an interposed U-shaped member, the contiguous ends of said channel bars being provided with coöperating corrugations extending transversely across said bars.

In testimony whereof, I have signed my name to this specification, in the presence of two subscribing witnesses.

BASIL MAGOR.

Witnesses:
  JOHN W. THOMPSON,
  ALEXANDER S. GROSS.